United States Patent Office 2,916,476
Patented Dec. 8, 1959

2,916,476

POLYAMIDES OF XYLENEDIAMINE AND AN ALIPHATIC DIBASIC ACID UP-GRADED WITH 1,4-CYCLOHEXANEBIS (METHYLAMINE)

John R. Caldwell and Russell Gilkey, Kingsport, Tenn., assignors to Eastman Kodak Company, Rochester, N.Y., a corporation of New Jersey No Drawing. Application October 24, 1956
Serial No. 617,903

18 Claims. (Cl. 260—78)

This invention relates to improved linear highly polymeric fiber-forming copolyamides of the class consisting of xylene-$\alpha,\alpha'$-diamine especially the meta-isomer, condensed with an up-grading diamine and an aliphatic dicarboxylic compound containing from 6 to 12 carbon atoms. The up-grading co-ingredient or component is employed in amounts up to about 50 mole percent of the total diamines used. This up-grading diamine is 1,4-cyclohexanebis(methylamine). This invention also relates to the preparation of these improved copolyamides. They are characterized by having higher melting points than the homopolyamides prepared without using 1,4-cyclohexanebis(methylamine). The copolyamides of this invention have melting points which are generally well above 200° C. The most advantageous copolyamides of this invention have melting points above 250° C. The copolyamides having the higher melting points are characterized by sticking temperatures well above the sticking temperatures of 6-nylon and nylon 66 which are currently in commercial production for textile use.

It is apparent that the up-grading of the homopolyamides in accordance with the invention serves to make available improved polyamides of the specified class. It particularly serves to up-grade those polyamides which may formerly have been considered of rather limited value but which can now be improved to a surprisingly significant degree.

This invention was quite unexpected in view of the fact that it is or represents an exception to Flory's rule. This rule is discussed at considerable length by Flory in J. Am. Chem. Soc. 72, 2024 (1950). The theoretical derivation is given, along with considerable experimental verification. This melting point rule has been widely accepted in the field of polymer science and in fact, is often called Flory's melting point "law." The general validity of this rule has been established for polyesters, polyamides, and vinyl polymers. The copolyamides disclosed herein and those described in copending applications referred to herein represent exceptions to Flory's rule. By virtue of these exceptions, the very important discovery has been made that certain classes of polyamides can be up-graded and their utility thereby increased. See copending applications Serial Nos. 617,902, filed by the inventors herein, and 617,931 filed by Bell, Smith and Kibler on even date herewith. The copolyamides primarily derived from 1,4-cyclohexanebis(methylamine) are covered by application Serial No. 617,931.

In the literature citation given above, Flory shows that the addition of any other component to a polyamide will lower the melting point of the polyamide, even if a high-melting component is added. According to this rule, if component A is added during the formation of polymer B, the melting point of the resulting copolymer will be depressed. According to the definitions used by Flory, a copolyamide is named according to the component that is present in the larger amount on a molar basis. That is, a copolyamide that contains more than 50 mole percent of adipic acid and less than 50 mole percent of sebacic acid is considered to be a modified adipic acid polyamide and the sebacic acid is considered as the component which depresses the melting point of the adipic acid polyamide. The same reasoning prevails if the polyamide contains mixed diamines. Flory states that the melting point depression is very nearly independent of the co-ingredients used. For the purpose of further illustrating Flory's rule, some data is presented in the table below. In this table, the co-ingredient is described as 6–10, 6–6, etc. wherein the first figure refers to the number of carbon atoms in a straight-chain diamine and the second figure represents the number of carbon atoms in a straight-chain dibasic acid. Thus, 6–6 is nylon 66 and 10–6 is polymerized decamethylene adipamide.

COPOLYAMIDES OF DECAMETHYLENE SEBACAMIDE

| Co-Ingredient | Mole Fraction of Decamethylene Sebacamide | Melting Point, °C. |
|---|---|---|
| None | 1.0 | about 209 |
| 10-Terephthalic | 0.9 | 203–204 |
| 6–10 | 0.9 | 203–204 |
| 6–10 | 0.8 | 195–197 |
| 10–6 | 0.8 | 195–197 |
| 10-Isophthalic | 0.8 | 195–197 |
| 6–6 | 0.8 | 195–197 |
| 6–10 | 0.7 | about 188 |
| 6–10 | 0.6 | about 181 |

It can be seen from this table that the melting point of the homopolymer (209° C.) is depressed in a regular manner, depending upon the mole fraction of the co-ingredient present, even though the co-ingredient melts higher than the homopolyamide, for example, 6–6 melts at 264° C. and 10-terephthalic melts above 300° C. and yet, as a co-ingredient, each of these reduces the melting point of the homopolyamide to well below 209° C.

It has been noted that the copolyamide of adipic acid and terephthalic acid with hexamethylenediamine does not show the depression of melting point that would be predicted from Flory's rule. However, those two acids are almost identical in chain length and hence give isomorphous crystals. That is, they both fit into the same crystal lattice and there is no disturbance of the crystal structure. The physical-chemical laws of melting point depression do not apply to isomorphous systems. It does not appear that the up-grading co-ingredient used in the polyamides of the present invention give isomorphous systems.

The polyamides of meta and para-xylene-$\alpha,\alpha'$-diamine are known in the art and are referred to broadly in the earlier patents of Carothers such as U.S. 2,130,523, U.S. 2,130,948, etc., and in other related earlier patents such as U.S. 2,245,129 and U.S. 2,181,663. Meta-xylene-$\alpha,\alpha'$-diamine is a potentially cheap diamine and would be quite valuable as a component for the preparation of polyamides for general textile use except, primarily, for the fact that the homopolyamides melt at temperatures which are undesirably low for most fiber and film purposes. For example, the homopolyamide made with adipic acid melts at 230° C., which is undesirably low for a textile fiber. Thus, the up-grading accomplished in accordance with this invention is quite important to the broad commercial utilization of meta-xylene-$\alpha,\alpha'$-diamine, especially for general textile purposes.

Moreover, by upgrading these polyamides, it has been quite surprisingly discovered that the physical and chemical characteristics, especially the tensile moduli, are such that the copolyamides formed are excellent in forming fibers which can be employed as in tire cords.

Since the meta-isomer of xylene-$\alpha,\alpha'$-diamine is, among other things, the least expensive and most readily available isomer, this invention is primarily directed toward the employment of the meta-isomer in the preparation of the copolyamides being up-graded as described herein.

The following tabulation will serve to illustrate the effect of the improvement of this invention on the class of polymers derived from m-xylene-α,α'-diamine employing adipic acid as the aliphatic dicarboxy compound containing from 6 to 12 carbon atoms.

COPOLYAMIDES OF m-XYLENE-α,α'-DIAMINE WHEREIN A PART OF SAID DIAMINE OR SAID DICARBOXYLIC ACID IS REPLACED WITH THE INDICATED MODIFIER

| Modifier | Mole percent of modifier | Melting Point of copolyamide, ° C. |
| --- | --- | --- |
| None | 0 | 230 |
| Trans-1,4-cyclohexanedicarboxylic acid | 20 | 275 |
| Trans-1,4-cyclohexanedicarboxylic acid | 30 | 300 |
| Oxalic acid | 20 | 280 |
| Terephthalic acid | 20 | 215 |
| 1,4-cyclohexanebis (methylamine) | 30 | 250 |
| 1,4-cyclohexanebis (methylamine) | 40 | 255–270 |

It is to be noted that 20% terephthalic acid served to lower the melting point of the polyamide even though the melting point of a homopolyamide formed from terephthalic acid and m-xylene-α,α'-diamine has a very high melting point well above 230° C. This is the usual result which would be predicted from Flory's rule.

As already mentioned, many of the copolyamides produced in accordance with this invention have excellent value in the formation of fibers for employment in tire cords. Previously known useful polyamide fibers which have been used to some extent in tire cord have not been fully satisfactory since the initial tensile modulus of those which have been commercially available, such as nylon 66, have only had values of from about less than 30 up to about 40 for certain special fibers specifically designed for use as tire cords.

The initial tensile modulus of elasticity referred to throughout this specification is the stress in grams per denier, measured at 1% elongation, multiplied by 100, i.e. it is in units of gm./100 denier.

The fibers produced in accordance with this invention have in many instances an initial tensile modulus as high as 70 or higher and are therefore quite worthwhile as fibers for the preparation of tire cord. A high modulus is particularly important in tire cord since under heavy loads, a low-modulus tire cord tends to stretch excessively, thus leading to growth or permanent distortion of the diameter of the tire. Furthermore, a tire tends to develop temporary flat spots when the vehicle is parked for a long period of time. These flat spots persist for several miles of travel and cause an annoying bump as the wheels of the vehicle revolve which serves to reduce the comfort of traveling as well as increasing the maintenance of the vehicle as a result of the excessive vibration. It is well known that nylon tire cords now in use are subject to these deficiencies even though they have high tensile strength. The modulus of the copolyamides described herein is in the range of about 65–70 or higher. This modulus range is even higher than that of cotton and viscose which have a modulus of about 55–65 which is the highest modulus of any tire cord in current commercial use.

It is an object of this invention to provide improved upgraded linear highly polymeric fiber-forming copolyamides derived from at least 50 mole percent of meta-xylene-α,α'-diamine and 10 to 50 mole percent of 1,4-cyclohexanebis(methylamine) condensed with an aliphatic dicarboxy compound.

It is a further object of this invention to provide a process for preparing such an upgraded copolyamide by means of the known process steps for preparing related polyamides with the exception that a substantial proportion of one of the components is replaced with an upgrading component or co-ingredient as defined herein.

It is a further object to provide fibers, films and other articles of manufacture having improved melting points and other desirable physical and chemical characteristics resulting from the upgrading of certain polyamides in accordance with this invention.

Other objects will become apparent hereinafter.

According to one embodiment of this invention, we have found that a great improvement can be achieved in regard to the linear highly polymeric fiber-forming copolyamides of the class consisting of polymers derived from m-xylene-α,α'-diamine condensed with an aliphatic dicarboxy compound containing from about 6 to about 12 carbon atoms, which improvement is achieved by having from 10 to 50 mole percent of the recurring structural units in the copolyamide derived from 1,4-cyclohexanebis (methylamine) which serves as an upgrading component.

The preparation of 1,4-cyclohexanebis(methylamine) is referred to in the copending application mentioned above. It is also described in Ber. 71B, 759 (1938). The 1,4-cyclohexanebis(methylamine) most advantageously employed in accordance with this invention is essentially trans material (95–100% trans isomer); however, either the cis or trans isomers or mixtures can be employed and such is contemplated throughout this specification and claims except in those instances where specific copolyamides are mentioned and identified as to their properties which are based upon the employment of essentially trans material. The copolyamides employing essentially cis material generally are of only moderately lower melting point than the corresponding copolyamide formed from essentially trans material. The initial tensile modulus is not significantly affected by the presence of this cis configuration. All of the copolyamides of this invention are characterized by melting points higher than the homopolyamides which contain none of the said upgrading component.

The novel copolyamides of this invention can be prepared by a process which essentially comprises condensing from 90 to 50 mole percent of m-xylene-α,α'-diamine and from 10 to 50 mole percent of 1,4-cyclohexanebis (methylamine) with an aliphatic dicarboxy compound containing from 6 to 12 carbon atoms.

The condensation can generally be advantageously accomplished by heating the diamines with the aliphatic dicarboxy compound under conditions that will produce a polyamide. Most advantageously, salts of the diamines and the aliphatic dicarboxy compounds can be formed and are then heated at an elevated temperature of from about 200° to about 300° C. for several hours in a closed vessel in an inert atmosphere. Thus, the purified salts of the diamines can be placed in an autoclave including from 10 to 25 percent of water. The autoclave can then be closed and the mixture advantageously heated at 210–270° C. for several hours to produce a low-molecular weight copolyamide. A high-molecular weight polymer can then be obtained by further heating this product at atmospheric pressure under an inert atmosphere or in a vacuum. The employment of purified salts insures that the diamine and the dicarboxylic acid are employed in equivalent amounts. Solvents such as cresol or xylenol can be employed during the reaction. Other techniques can be used in preparing the copolyamides of this invention. Such techniques are well known in the art and are illustrated in numerous patents and publications. It is not believed necessary or desirable to go into all of the variations and ramifications which can be employed in preparing the copolyamides of this invention.

The copolyamides of this invention can be formed into fibers, films, extrusions, molded objects, coating compositions, etc. using those techniques well known in the art for melt-spinning, extruding, etc.

In order to be suitable for the manufacture of films, fibers, sheets, and molded objects, the copolyamide should have an inherent viscosity of about 0.4 or higher. Generally, such a viscosity of from 0.6 to 0.8, as determined in a solvent composed of 60 parts of phenol and 40 parts of tetrachloroethane produces a copolyamide of quite advantageous properties. In some instances where a particularly high inherent viscosity is not desired, it may be desirable to add a chain terminator or stabilizer such as acetic acid or benzoic acid to the reaction mixture in order to keep the viscosity from exceeding the desired range.

The aliphatic dicarboxy compounds containing from 6 to 12 carbon atoms which can be employed in accordance with this invention are illustrated by adipic acid, pimelic acid, suberic acid, azelaic acid, sebacic acid, dodecane-1, 12-dioic acid, 3-methyladipic acid, and other dicarboxylic acids having from 1 to 2 methyl groups attached to the main hydrocarbon chain in a position preferably not in alpha relationship to a carboxy radical, e.g. 4-methyladipic acid, 5-methylsuberic acid, 3,3-dimethyladipic acid, etc. Although this invention is primarily concerned with those aliphatic dicarboxy compounds containing from 6 to 12 carbon atoms, polyamides can also be prepared wherein the dicarboxy compound contains fewer or more carbon atoms, e.g. dimethylmalonic acid, 3-methylsuccinic acid, brassylic acid, etc.

This invention can be further illustrated by the following examples of preferred embodiments although it will be understood that these examples are included merely for purposes of illustration and are not intended to limit the scope of the invention unless otherwise specifically indicated:

*Example 1.—Copolyamide*

0.6 mole proportions of m-xylene-alpha,alpha'-diammonium adipate (salt of m-xylene-alpha,alpha'-diamine and adipic acid) plus 0.4 mole proportions of 1,4-cyclohexanebismethylene-diammonium adipate (salt of 1,4-cyclohexanebis(methylamine) and adipic acid) were mixed together and 150 grams of this mixture together with 50 milliliters of water containing 0.015 gram of acetic acid were placed in a steel autoclave. The autoclave was purged with nitrogen, heated to about 120° C. and further purged of air by blowing off a small amount of steam. It was then closed and heated with shaking for about 20 minutes at about 250° C. The autoclave was cooled and the low-molecular weight copolyamide was transferred to a reaction vessel equipped with a stirrer, a short distillation column and an inlet for purified nitrogen. The mixture was heated at about 250° C. with stirring until the excess water was eliminated and the temperature was then gradually increased in order to maintain a clear melt. The stirred melt was finally heated for 30 minutes at about 285° C. under a vacuum of about 0.2 mm. A high-viscosity colorless polyamide was obtained which had a melting point of 255°–270° C. This copolyamide was melt-spun to form fibers having excellent physical and chemical characteristics as discussed above. It was also formed into transparent film and molded objects. The fibers had a tensile modulus of 65–70.

*Example 2.—Copolyamide*

The procedure described in Example 1 was repeated employing a ratio of 0.7 to 0.3 mole proportions of the respective salts. The copolyamide which formed had a melting point in the vicinity of 250° C. This copolyamide was melt-spun to form fibers having excellent physical properties and was melt-extruded to form film which had similar excellent physical characteristics. These films were excellent wrapping materials and could be used as supports for photographic silver halide gelatin emulsions of either the color or the black-and-white types.

Additional copolyamides were prepared as described in Examples 1 and 2 employing sebacic acid or 3-methyladipic acid. Also, other copolyamides were prepared containing proportions of p-xylene-α,α'-diamine up to 50 percent of the isomers thereof being used. Further copolyamides were prepared employing 1,4-cyclohexanebis (methylamine) in proportions of from 10 to 50 mole percent of the total diamines employed. All of these copolyamides had properties as discussed above.

*Example 3.—Copolyamide*

The procedure of Example 1 was repeated employing a ratio of 0.5 to 0.5 mole of the respective salts. The product melted in the range of 275–290°. Fibers spun by the melt method had a tenacity of 5.7 grams per denier, elongation of 18%, and a sticking temperature of 230–235° C. Their elastic modulus was 70–75. These fibers were particularly useful as tire cords and as reinforcing cords in rubber belting.

*Example 4.—Copolyamide*

A copolyamide was made from 1.0 mole of sebacic acid, 0.55 mole m-xylene-α,α'-diamine, and 0.45 mole 1,4-cyclohexanebismethylamine. It melted in the range of 220–230° C. which is about 30° higher than homopolymer made with m-xylenediamine alone. This product is especially valuable as a molding plastic because it has a high impact strength even at −40° C.

Although the invention has been described in considerable detail with reference to certain preferred embodiments thereof, it will be understood that variations and modifications can be effected without departing from the spirit and scope of the invention.

We claim:

1. A linear highly polymeric fiber-forming copolyamide of (1) a mixture of amines composed of (a) 90 to 50 mole percent of said mixture of a xylene-α,α'-diamine, at least half thereof being the meta isomer, any balance being the para isomer, and (b) 10 to 50 mole percent of said mixture of 1,4-cycohexanebis(methylamine) with (2) a saturated aliphatic dicarboxy compound containing from about 6 to about 12 carbon atoms, which copolyamide is characterized by an increased melting point contributed to the properties of the copolyamide by said 1,4-cyclohexane bis(methylamine).

2. A copolyamide as defined by claim 1 wherein said mixture of amines is composed of 50 to 90 mole percent of m-xylene-α,α'-diamine and 10 to 50 mole percent of 1,4-cyclohexanebis(methylamine) and said dicarboxy compound is adipic acid.

3. A copolyamide as defined by claim 1 wherein said mixture of amines is composed of 50 to 90 mole percent of m-xylene-α,α'-diamine and 10 to 50 mole percent of 1,4-cyclohexanebis(methylamine) and said dicarboxy compound is sebacic acid.

4. A copolyamide as defined by claim 1 wherein said mixture of amines is composed of 50 to 90 mole percent of m-xylene-α,α'-diamine and 10 to 50 mole percent of 1,4-cyclohexanebis(methylamine) and said dicarboxy compound is methyladipic acid.

5. A copolyamide as defined by claim 1 wherein said mixture of amines is composed of 50 to 90 mole percent of m-xylene-α,α'-diamine and 10 to 50 mole percent of 1,4-cyclohexanebis(methylamine) and said dicarboxy compound is suberic acid.

6. A copolyamide as defined by claim 1 wherein said mixture of amines is composed of 50 to 90 mole percent of m-xylene-α,α'-diamine and 10 to 50 mole percent of 1,4-cyclohexanebis(methylamine) and said dicarboxy compound is pimelic acid.

7. A fiber of the copolyamide defined by claim 2.
8. A fiber of the copolyamide defined by claim 3.
9. A fiber of the copolyamide defined by claim 4.
10. A fiber of the copolyamide defined by claim 5.
11. A fiber of the copolyamide defined by claim 6.

12. Film of the copolyamide defined by claim 2.
13. Film of the copolyamide defined by claim 3.
14. Film of the copolyamide defined by claim 4.
15. Film of the copolyamide defined by claim 5.
16. Film of the copolyamide defined by claim 6.
17. A copolyamide as defined by claim 2 wherein said mixture of amines is composed of 60 mole percent m-xylene-α,α'-diamine and 40 mole percent 1,4-cyclohexanebis(methylamine) and said dicarboxy compound is adipic acid which copolyamide can be melted in the vicinity of 255°–270° C.
18. A copolyamide as defined by claim 2 wherein said mixture of amines is composed of 70 mole percent m-xylene-α,α'-diamine and 30 mole percent 1,4-cyclohexanebis(methylamine) and said dicarboxy compound is adipic acid which copolyamide can be melted in the vicinity of 250° C.

References Cited in the file of this patent

UNITED STATES PATENTS

| | | |
|---|---|---|
| 2,130,523 | Carothers | Sept. 20, 1938 |
| 2,163,636 | Spanagel | June 27, 1939 |

FOREIGN PATENTS

| | | |
|---|---|---|
| 1,112,203 | France | Nov. 9, 1955 |

OTHER REFERENCES

Malochowski et al.: Berichte Deut. Chem. Gesel., vol. 71B, 1938, pages 759 and 763. (Copy in Scientific Library.)